March 9, 1943.  P. P. RATIE ET AL  2,313,301
ASSEMBLY FOR THE BLADES OF VARIABLE PITCH AIRSCREWS
Filed Feb. 14, 1940
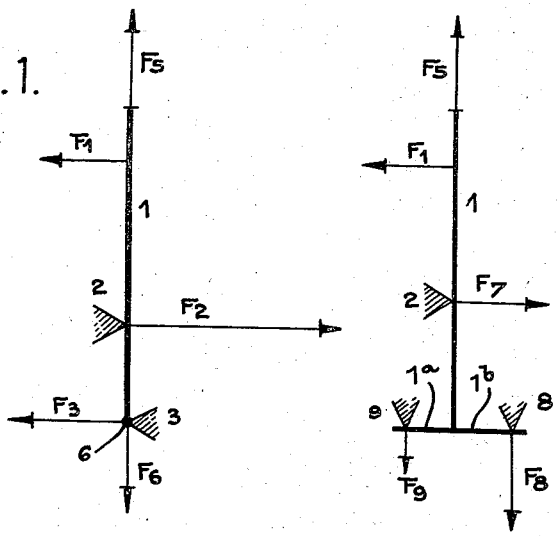
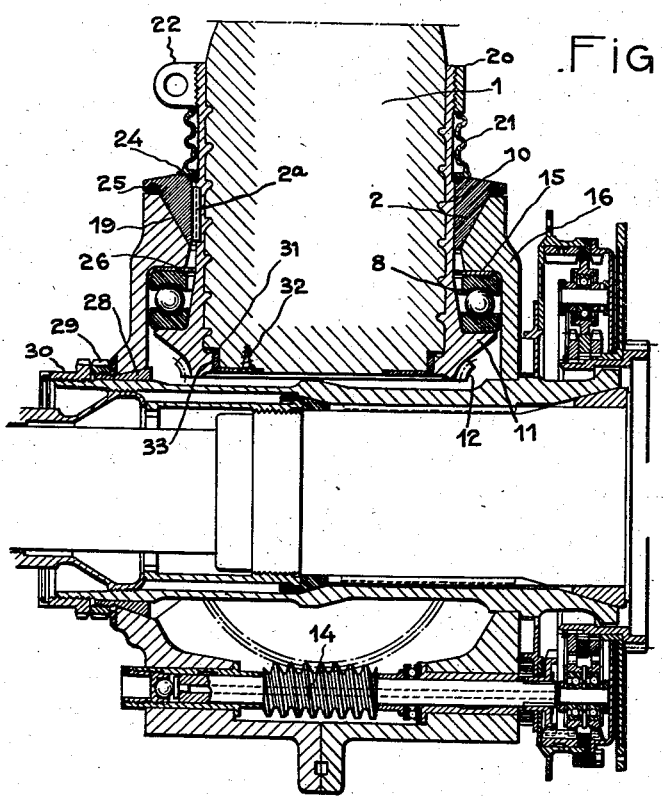
INVENTORS:
PIERRE PAUL RATIE AND
RENÉ JEAN RATIE
BY Haseltine, Lake & Co.
ATTORNEYS Patented Mar. 9, 1943

2,313,301

UNITED STATES PATENT OFFICE 2,313,301

ASSEMBLY FOR THE BLADES OF VARIABLE PITCH AIRSCREWS

Pierre Paul Ratié and René Jean Ratié, Montrouge, France; vested in the Alien Property Custodian Application February 14, 1940, Serial No. 318,888
In France February 28, 1939

2 Claims. (Cl. 170—162)

The present invention has for object an assembly for the blades of variable pitch airscrews. This assembly, which can be used for metal or wooden blades, is more particularly applicable to wooden blades; it improves the securing in position and the safety of the blades whilst allowing the latter to be rapidly assembled and replaced without it being necessary to dismantle the control and transmission mechanism ensuring the variation of the pitch of said blades. This rapid fitting up and taking to pieces of the blades facilitates transport, particularly of three-blade airscrews.

The assembly according to the invention is mainly characterised by the following points applied separately or in any combinations:

(a) The root of each blade is engaged, particularly by screwing, in a socket rotatively mounted in the corresponding radial drum of the airscrew hub.

(b) The socket is preferably slotted and provided with locking means ensuring the locking of the rigid connection between the root and the socket, the putting out of action of the locking means allowing the blade to be dismantled whereas the socket remains in position on the airscrew hub.

(c) The socket is held axially in the drum, in the centrifugal direction, by a ball bearing or the like.

(d) The socket is held laterally in the drum, by a ring, preferably a conical ring, pressing against a corresponding bearing of the drum, said ring being keyed on the socket.

(e) The ring is preferably made of a phenolic plastic known as Celoron.

(f) Resiliently distortable means, such as a washer or a resilient tube, are interposed between the conical ring and the member locking the socket on the root of the blade, said means acting, with a certain amount of pressure, on the ring and on the ball bearing.

(g) The shearing stress is supported by the ring whereas the centrifugal stress and the bending stresses are exerted on the ball abutment which surrounds the socket and has, for that purpose, a large diameter, the ring pressed against the conical bearing of the drum acting moreover as a brake and as a shock absorber for the blades mainly in order to avoid hammering on the members controlling the incidence of the blades.

The invention also includes other particular points which will appear in the following text given with reference to the accompanying drawing, by way of example only, in which:

Figs. 1 and 2 are explanatory diagrams.

Fig. 3 is a partial elevation, in section, of an assembly devised according to the invention.

In order to indicate the technical advantages obtained by the assembly forming the subject-matter of the present application, reference will initially be made to the diagrams illustrated in Figs. 1 and 2.

Fig. 1 shows a rod 1 subjected, on the one hand, to the action of a transverse force $F^1$ and, on the other hand, to the action of a longitudinal force $F^5$. The force $F^1$ presses the rod 1 against a bearing 2, the reaction on an abutment 3, parallel to the bearing 2, being $F^3$. By composing $F^1$ and $F^3$ a reaction $F^2$ is obtained on the bearing 2 which is equal to the sum of $F^1$ and $F^3$ and which gives, in absolute value, the value of the shearing stress exerted on the rod 1. Moreover, said rod 1 is secured at 6 to the abutment 3, the reaction $F^6$ being equal to the force $F^5$.

Fig. 2 shows a rod 1 which, as the previous rod, is subjected to the action of both forces $F^1$ and $F^5$. In the case of Fig. 2, said rod 1 comprises a transverse part $1^a$—$1^b$ pressed against abutments 8 and 9. Said rod 1 is pressed against the bearing 2 by the force $F^1$ and the reaction on the bearing 2 is $F^7$ which is only equal to $F^1$. In fact, in said Figure 2, the abutment 3 parallel to the bearing 2 (Fig. 1) is replaced by the two abutments 8 and 9 at right angles to said bearing. In these conditions, the reactions on the abutments 8 and 9, of the forces $F^1$ and $F^5$, are indicated by $F^8$ and $F^9$, a part of the reaction $F^8$ being due to the force $F^1$ only.

If the rod 1 diagrammatically illustrates an airscrew blade subjected, on the one hand, to bending stresses $F^1$ owing to the pull exerted by said blade during its utilisation and, on the other hand, to centrifugal force $F^5$, it will be seen that, in the case of the assembly of Fig. 2, the shearing stress exerted on the embedding of the root (bearing 2) is considerably reduced in the case of Fig. 2 relatively to a blade mounted as illustrated by the diagram of Fig. 1.

Fig. 3 illustrates an assembly carrying into practice the diagram of Fig. 2. The root 1 of a blade is screwed in a socket 10 provided with a flange 11 and cut at 12 so as to constitute a worm wheel meshing with a worm 14 controlling the variation of the pitch of the blades. A ball bearing 8, surrounding the socket 10, is interposed between the flange 11 and a shoulder 15 formed on a corresponding radial drum 16 rigid with the hub 18 of the airscrew.

The socket 10, which is held in the centrifugal direction by the ball bearing 8, is radially retained by a ring 2 made of a phenolic plastic such as Celoron for instance, said ring 2 being pressed by its outer conical surface against a corresponding conical bearing 19 provided at the end of the drum 16.

The socket 10 is combined with locking means allowing an assembler to rigidly and positively lock said socket and the corresponding root of the blade after said root has been screwed in the socket. These locking means are constituted by a slotted ring or collar 20 screwed on the corresponding end, also slotted, of the socket 10. After engaging a resilient tube 21, taking a bearing on the ring 2, the collar 20 is screwed on the socket 10 to a distance sufficient for tensioning the ring 21 to the desired amount and a bolt or the like is engaged in lugs 22 of the collar 20 to lock the latter in position and rigidly lock the socket 10 and the root 1 of the blade.

The ring 2 is rendered angularly rigid with the socket 10 by a key 2ª, fluid-tight packings being provided at 24 and 25. A fluid-tight plate is also provided at 26 between the ball bearing 8 and the shoulder 15 of the drum 16. The various drums each receiving a blade form part of one and the same member which is locked in position on the hub 18 through the medium of a conical ring 28 and a nut 29 combined with a lock-nut 30.

It will also be noted that the end of the root 1 of the blade is provided with a metal annular edge 31, held in position by screws 32 and which is centered in a corresponding bearing 33 of the socket 10.

According to an important feature of the present invention, the root 1 of each blade is mounted, in an easily removable manner, in the corresponding socket 10 which is permanently and rotatively mounted in the corresponding drum 16 of the hub. In fact, the assembly or the taking to pieces of each blade necessitates solely the screwing or unscrewing of the blade after putting out of action the locking means constituted by the collar 20 and without it being necessary to dismantle the mechanism controlling the variation of the pitch of the blades.

It will be noted that the ball bearing 8 acts as the abutment 8—9 of Fig. 2. The centrifugal stress of the blade is exerted on the ball bearing 8. Moreover, owing to the large diameter of said ball bearing 8, the bending stresses of the blade are also exerted on said ball bearing. The shearing stress is exerted on the conical ring 2 made of the phenolic plastic Celoron which constitutes, furthermore, a friction member forming shock absorber for the blades mainly in order to avoid hammering on the members controlling the incidence of the blades. The resilient tube 21 exerts a certain amount of pressure on the conical ring 2 and on the ball bearing 8. The centrifugal force exerted on the blades pressing against the bearing 8 prevents bending movement. The resilient tube 21 ensures a certain tension at low working speed and at rest. This metal tube compensates the reduction of centrifugal force for holding each blade in a correct position notwithstanding the action, even reduced, of the bending stresses.

It is obvious that the embodiment described and illustrated is given herein only by way of indication and not in a limiting sense. All modifications or changes which do not alter in any way the main features above set forth or the desired result, remain included in the scope of the present invention.

What we claim as our invention and desire to secure by Letters Patent is:

1. In a variable pitch airscrew having a plurality of drums or fixed sockets extending radially from a hub mounted on a drive shaft, means for retaining the root of each blade of the airscrew in assembled association with its respective drum on said hub, said means including a socket member secured to the root of each blade and mounted for rotation in one of said drums, a bearing disposed on each drum or fixed socket and a ring which is preferably of conical form engaging against each drum bearing and serving to retain the respectively associated socket member, a disengageable locking member which serves to lock the respective root of a blade in each socket member, a resiliently deformable annular member interposed between said locking member and the conical ring and a ball bearing surrounding each socket member so as to facilitate rotation and cooperate in retaining the same assembled with its respective drum, said annular member exerting a certain amount of pressure on said ring and said ball bearing.

2. In a variable pitch airscrew having a plurality of drums or fixed sockets extending radially from a hub mounted on a drive shaft, means for retaining the root of each blade of the airscrew in assembled association with its respective drum on said hub, said means including a socket member secured to the root of each blade and mounted for rotation in one of said drums, a bearing disposed on each drum or fixed socket and a ring which is preferably of conical form engaging against each drum bearing and serving to retain the respectively associated socket member, a disengageable locking member which serves to lock the respective root of a blade in each socket member, a ball bearing of large diameter surrounding each socket member so as to facilitate rotation and cooperate in retaining the same assembled with its respective drum, and control members serving to alter the incidence of the blades, the conical ring acting as a brake and a shock absorber to avoid hammering on said control members, and the shearing strain being resisted by said conical ring, and the large diameter of the ball bearing opposing the bending and centrifugal forces acting on each blade.

PIERRE PAUL RATIE.
RENÉ JEAN RATIÉ.